US008582469B2

(12) United States Patent
Rosenberg

(10) Patent No.: US 8,582,469 B2
(45) Date of Patent: Nov. 12, 2013

(54) PEER-TO-PEER NETWORK INCLUDING ROUTING PROTOCOL ENHANCEMENT

(75) Inventor: Jonathan Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 519 days.

(21) Appl. No.: 11/939,919

(22) Filed: Nov. 14, 2007

(65) Prior Publication Data
US 2009/0122724 A1 May 14, 2009

(51) Int. Cl.
H04L 12/28 (2006.01)

(52) U.S. Cl.
USPC .......................................... 370/254; 370/400

(58) Field of Classification Search
USPC ........ 370/254, 256, 400, 401; 707/2; 709/217
See application file for complete search history.

(56) References Cited

U.S. PATENT DOCUMENTS

| | | | |
|---|---|---|---|
| 7,197,565 B2 * | 3/2007 | Abdelaziz et al. ............ 709/226 |
| 7,206,841 B2 * | 4/2007 | Traversat et al. ............. 709/225 |
| 7,313,565 B2 * | 12/2007 | Zhang et al. ........................... 1/1 |
| 7,516,116 B2 * | 4/2009 | Shen et al. ......................... 707/2 |
| 7,533,161 B2 * | 5/2009 | Hugly et al. .................... 709/220 |
| 7,643,458 B1 * | 1/2010 | Talwar et al. .................. 370/338 |
| 7,643,459 B2 * | 1/2010 | Miller et al. ................... 370/338 |
| 8,037,202 B2 * | 10/2011 | Yeager et al. .................. 709/238 |
| 8,301,880 B2 * | 10/2012 | Jennings et al. .............. 713/156 |
| 2003/0028585 A1 * | 2/2003 | Yeager et al. .................. 709/201 |
| 2004/0019641 A1 * | 1/2004 | Bartram et al. ................ 709/205 |
| 2004/0030794 A1 * | 2/2004 | Hugly et al. ................... 709/230 |
| 2004/0044727 A1 * | 3/2004 | Abdelaziz et al. ............ 709/203 |
| 2004/0054723 A1 * | 3/2004 | Dayal et al. ................... 709/204 |
| 2004/0088369 A1 * | 5/2004 | Yeager et al. .................. 709/217 |
| 2004/0098447 A1 * | 5/2004 | Verbeke et al. ............... 709/201 |
| 2004/0249972 A1 * | 12/2004 | White et al. ................... 709/243 |
| 2004/0255028 A1 * | 12/2004 | Chu et al. ....................... 709/227 |
| 2005/0152286 A1 * | 7/2005 | Betts et al. ..................... 370/255 |
| 2005/0193106 A1 * | 9/2005 | Desai et al. .................... 709/223 |
| 2005/0243740 A1 * | 11/2005 | Chen et al. ..................... 370/256 |
| 2006/0168319 A1 * | 7/2006 | Trossen ......................... 709/238 |
| 2006/0221958 A1 * | 10/2006 | Wijnands et al. ............. 370/389 |
| 2006/0239275 A1 * | 10/2006 | Zlateff et al. ................. 370/400 |
| 2006/0282309 A1 * | 12/2006 | Zhang et al. .................... 705/14 |
| 2007/0079004 A1 * | 4/2007 | Tatemura et al. ............. 709/238 |

(Continued)

FOREIGN PATENT DOCUMENTS

WO   WO 2006068365 A1 *   6/2006

OTHER PUBLICATIONS

Stoica et al. (Chord: A Scalable Peer-to-Peer Lookup Protocol for Internet Applications).*
Handley et al. (A Scalable Content-Addressable Network—2001).*

(Continued)

Primary Examiner — Marsha D Banks Harold
Assistant Examiner — Christopher Wyllie
(74) Attorney, Agent, or Firm — Baker Botts L.L.P.

(57) ABSTRACT

Methods, apparatuses and systems that enhance the operation of peer-to-peer networks with routing protocols. In a particular implementation, peer nodes of a peer-to-peer network use an enterprise routing protocol to construct p2p network routing tables that support identification of peer nodes implementing a distributed hash table. This allows each peer node on the p2p network to know about every other node, and to learn, within IP network routing convergence times, of the arrival, departure, and failure of peer nodes in the p2p network. It also allows for single hop queries to other peer nodes.

25 Claims, 5 Drawing Sheets

(56) References Cited

U.S. PATENT DOCUMENTS

| | | | |
|---|---|---|---|
| 2007/0097885 A1* | 5/2007 | Traversat et al. | 370/254 |
| 2007/0167187 A1* | 7/2007 | Rezvani et al. | 455/550.1 |
| 2007/0230482 A1* | 10/2007 | Shim et al. | 370/400 |
| 2007/0239759 A1* | 10/2007 | Shen et al. | 707/102 |
| 2008/0089334 A1* | 4/2008 | Soja-Molloy et al. | 370/392 |
| 2008/0130516 A1* | 6/2008 | You et al. | 370/254 |
| 2008/0215734 A1* | 9/2008 | Walker et al. | 709/226 |
| 2008/0313450 A1* | 12/2008 | Rosenberg | 713/2 |
| 2009/0028165 A1* | 1/2009 | Rusitschka et al. | 370/400 |
| 2009/0122724 A1* | 5/2009 | Rosenberg | 370/255 |
| 2012/0207061 A1* | 8/2012 | Smith et al. | 370/255 |

OTHER PUBLICATIONS

Stoica, Ion, et al., "Chord: A Scalable Peer-to-peer Lookup Protocol for Internet Applications", research sponsored by the Defense Advanced Research Projects Agency (DARPA) and the Space and Naval Warfare Systems Center, San Diego, under contract N66001-001-8933. http://pdos.csail.mit.edu/chord/papers/paper-ton.pdf, publication year 2001.

Lua, Eng Keong, et al. "A Survey and Comparison of Peer-to-Peer Overlay Network Schemes", IEEE Communications Survey and Tutorial, Mar. 2004.

* cited by examiner

Fig._2

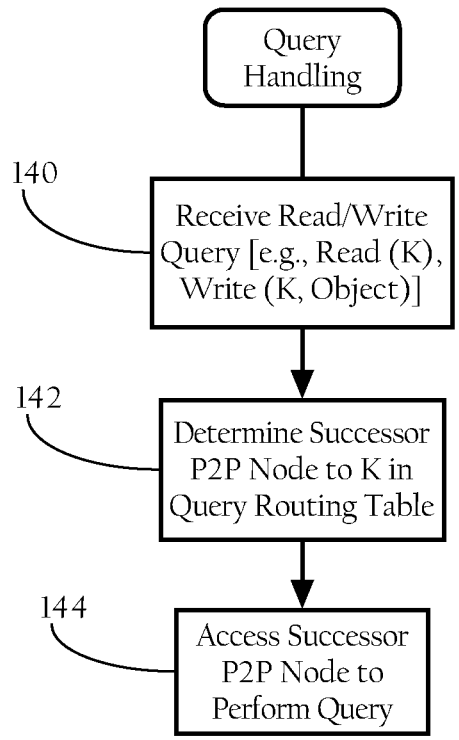
Fig._4

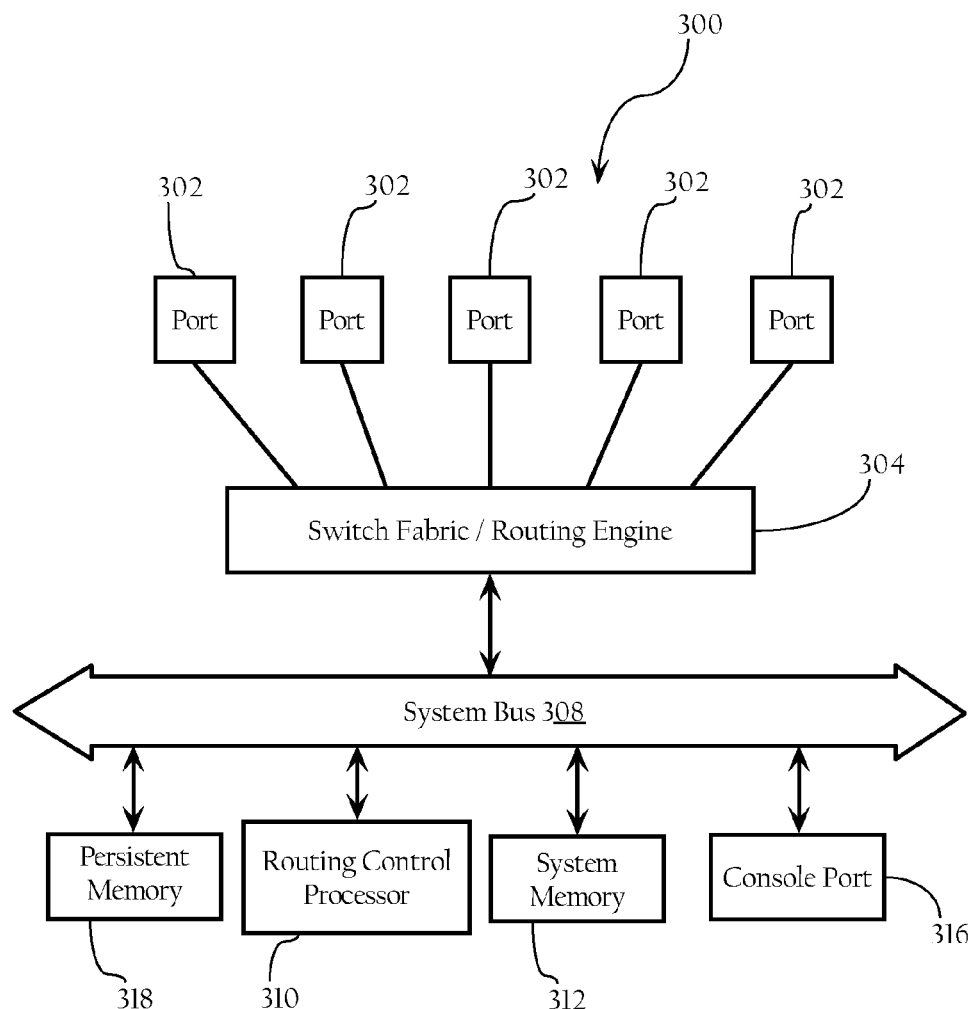
Fig._5

PEER-TO-PEER NETWORK INCLUDING ROUTING PROTOCOL ENHANCEMENT

TECHNICAL FIELD

This disclosure relates generally to peer-to-peer networks.

BACKGROUND

Peer-to-Peer networks have emerged relatively recently as a new kind of technology on the Internet. Originally used for illegal file sharing, they have found applications in data distribution, Voice over Internet Protocol (VoIP) systems, and video distribution. Modern peer-to-peer networks are based on the concept of a Distributed Hash Table (DHT). In a DHT, the contents of the hash table are distributed amongst the peer nodes participating in the peer-to-peer network. Each node stores a small sliver of the hash table. Each peer node maintains links to other peer nodes, so that when one peer node needs to look up a key in the distributed hash table, it can forward the request to a node closer, which forwards it closer, and so on. Here, 'closer' refers not to topological proximity, but rather, closeness of the keys used in the hash table.

Peer-to-peer networks have several important benefits. The biggest by far is that, if there are N peer nodes in the network, the amount of data each one node needs to store is 1/N of the total data. Thus, as the network grows, the scalability improves. Peer-to-peer networks facilitate new members coming and going, dynamically shuffling data around as the network grows. They also have relatively fast query times, allowing data to be found in logN hops across the network.

However, peer-to-peer networks have several drawbacks. Firstly, though they adapt to change, they are slow in that adaptation. Because peer-to-peer networks are typically implemented as overlays, each node only gradually learns about failures of other nodes to which they are adjacent. Network partitions, for example, can take a long time to fully detect and repair. Furthermore, while logN hops per query is certainly better than N, in a network where each node is 100 ms from another, queries can take many seconds to complete, even when there are relatively few nodes in the network. That makes peer-to-peer networks less optimized for real time applications.

DESCRIPTION OF THE DRAWINGS

For a more complete understanding of the present invention and its features and advantages, reference is now made to the following description, taken in conjunction with the accompanying drawings, in which:

FIG. 4 is a flow diagram illustrating an example method for processing a query in a peer-to-peer network;

FIG. 5 is a schematic diagram illustrating an example system architecture of a router.

DESCRIPTION OF EXAMPLE EMBODIMENTS

A. Overview

The present invention provides methods, apparatuses and systems that enhance the operation of peer-to-peer networks with routing protocols. In a particular implementation, peer nodes of a peer-to-peer network use an enterprise routing protocol to construct p2p network routing tables that support identification of peer nodes implementing a distributed hash table. This allows each peer node on the p2p network to know about every other node, and to learn, within IP network routing convergence times, of the arrival, departure, and failure of peer nodes in the p2p network. It also allows for single hop queries to other peer nodes.

Certain embodiments of the invention may include none, some, or all of the above technical advantages. One or more other technical advantages may be readily apparent to one skilled in the art from the figures, descriptions, and claims included herein.

B. Example Network System Architecture

B.1. Network Topology

Embodiments of the present invention and its advantages are best understood by referring to FIGS. 1 through 5 of the drawings, like numerals being used for like and corresponding parts of the various drawings.

Figure 1:
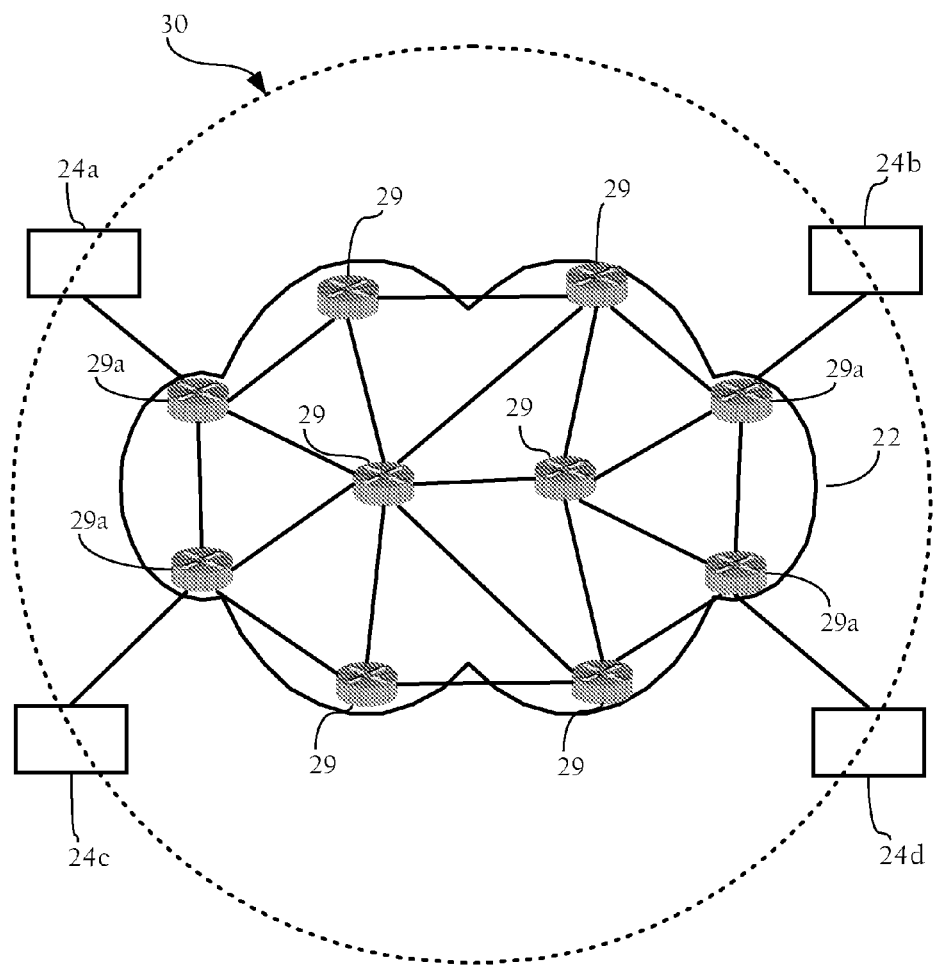
FIG. 1 is a block diagram of an example peer-to-peer network.

FIG. 1 is a functional diagram of an example peer-to-peer network 30 operating across an IP network 22. In the illustrated network, the peer nodes 24*a-d* are members of peer-to-peer network 30. In a particular implementation, peer nodes 24*a-d* are VoIP gateways or call managers that rely on P2P technologies to share VoIP call routing information. Embodiments of the present invention, however, can be used in a wide variety of P2P network types, such as file sharing networks, and the like. The peer nodes 24*a-d* can be other types of nodes, including but not limited to computers, IP connected peripherals, IP phones, servers, software running on a PC. They can use the P2P network to distribute any kind of information, including but not limited to files, multimedia content, user profile information, phone number information, or any other arbitrary data.

Routers 29 operably connect nodes, such as peer nodes 24*a-d* and other hosts, connected to respective networks 20*a-d* to IP network 22. Routers 29 may be physical routers or virtual routers of an MPLS VPN network. Routers 29 implement one or more routing protocols to exchange network reachability information and service availability information. In a particular implementation, the border routers 29*a* implement the Enhanced Interior Gateway Routing Protocol (EIGRP), or they may implement Open Shortest Path First (OSPF), Routing Information Protocol (RIP), Intermediate System-to-Intermediate System (IS-IS), Exterior Gateway Protocol (EGP), or Border Gateway Protocol (BGP). The functionality of the routers 29 of network 30 are extended to implement a service advertisement protocol which allows routers and other nodes to exchange information on available network services. Essentially, instead of propagating reachability to an IP address, the routers propagate reachability to a service with a particular service identifier. The service identifier can be thought of as a different address family, so instead of being IPv4 or IPv6 addresses, they are flat service addresses. Workstations, for example, can use this information to obtain the network addresses of servers that offer the services. In a particular implementation, the peer nodes 24 associate with routers 29 and subscribe to this service to receive information on other peers as well as to advertise their own presence on the network.

FIG. 5 illustrates an example system architecture 300 of a router 29. In one implementation, the system architecture 300 includes a routing processor 310, system memory 312, persistent memory 318 (e.g., flash memory or a hard disk drive), a routing engine/switch fabric 304 connected to a plurality of ports 302, a system bus 308 interconnecting these components, and one more software or firmware modules (loadable into system memory 312) directed to network routing functions (e.g., switch fabric and routing table/engine configuration, control message processing, BGP/IGP processing, and the like). Other functional modules may include discovery modules operative to discover the identity and capabilities of neighboring network devices. In one implementation, one or more of the ports 302 may be Ethernet interfaces. The system architecture 300 may optionally include a console port 316 allowing for administrative access for purposes such as configuration and diagnostics.

Figure 2:
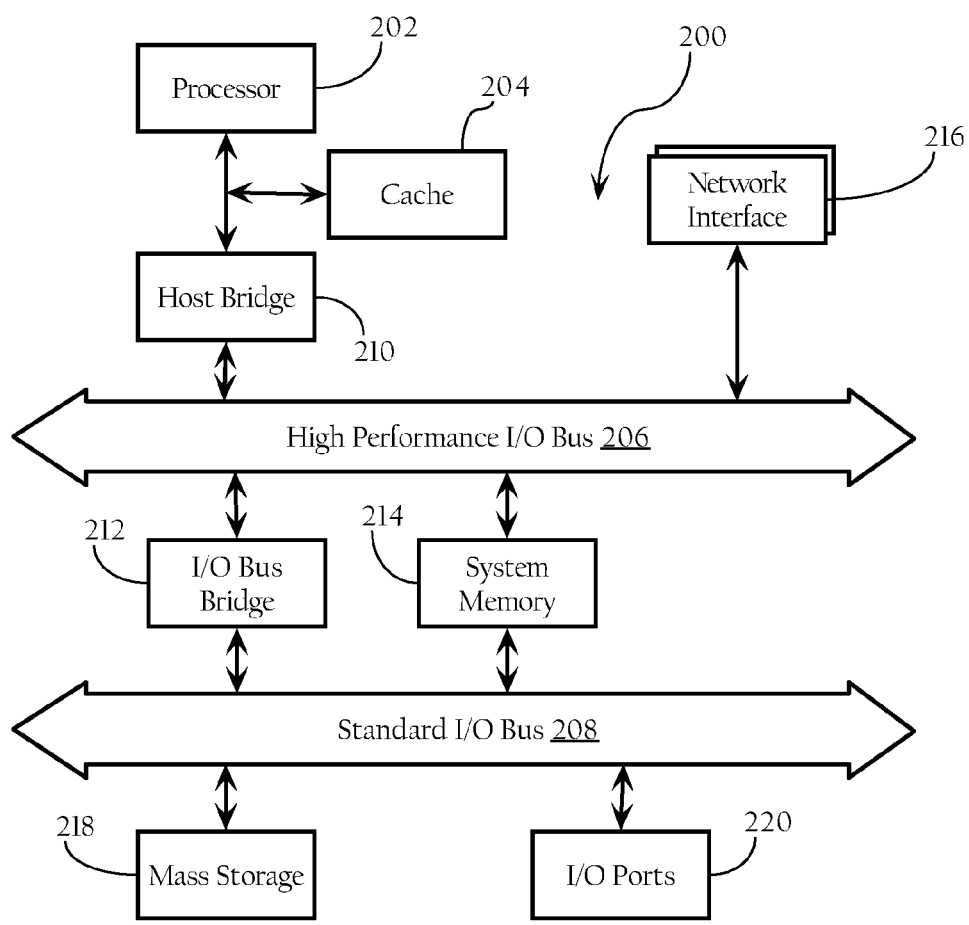
FIG. 2 is a schematic diagram illustrating elements of an example peer node system architecture.

FIG. 2 illustrates an example hardware system architecture 200 of a peer node. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the peer node described herein may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Apple Macintosh Operating System, available from Apple Computer Inc. of Cupertino, Calif., UNIX operating systems, Windows® 95/98/NT/XP/Vista operating systems, and the like.

C. Peer Node Operation

The peer nodes 24a-d of the peer-to-peer network 30 collectively implement a distributed hash table, where each node maintains a section of the hash table and maintains p2p network routing information to identify the peer nodes that correspond to other sections of the distributed hash table. In a hash table, a given object (such as an entry in a VoIP registry) has a key (K) formed by hashing a unique object identifier (such as a telephone number). The object identifier itself may be based on one attribute or a tuple of attributes. The object (such as an IP address of a VoIP gateway corresponding to the telephone number) is stored in an array at a location corresponding to its key. Typical operations include write(key, object) and read(key). The distributed hash table uses a p2p routing table to identify the node responsible for storing an object, and then communicates with the peer node to read or write the object.

In a particular implementation, the distributed hash table uses a common hash function across all peer nodes to generate peer node identifiers that are used to identify what sections of the distributed hash table a given peer node maintains. The consistent hash function assigns each node and key an m-bit identifier using a base hash function, such as SHA-1. Of course, other hash functions having suitable distribution properties to ensure that responsibilities for sections of the distributed hash table are distributed evenly can be used. A peer node's identifier can be chosen by hashing the node's IP address. Of course, the peer nodes identifier can be determined by hashing one or more attributes of the peer node that are unique (either alone or in combination), such as a MAC address, a digital certificate, and the like. In other implementations, a node identifier can be generated by hashing a random number. Alternatively, a node ID can be generated by a central authority and given to each node in the peer-to-peer network. Since node identifiers and keys share the same hash space, the relationship between node identifiers of the peer nodes 24 in the peer-to-peer network 30 can be used to allocate responsibility for sections of the distributed hash table. The identifier length m should be large enough to make the probability of two nodes or keys hashing to the same identifier negligible.

To assign a given key to a peer node, node identifiers can be ordered in a circular arrangement (module $2^m$), where the node identifiers are sorted in an ascending order. A given key, K, is assigned to the first node whose identifier is equal to or follows (the identifier of) k in the node identifier space. This peer node can be called the successor node of key K, denoted by successor(K). If identifiers are represented as a circle of numbers from 0 to $2^m-1$ in a clockwise ascending order, then successor(K) is the first node clockwise from k. To maintain the consistent hashing mapping when a peer node n joins the network, certain keys previously assigned to n's successor now become assigned to n. When the peer node n leaves the network, all of its assigned keys are reassigned its successor.

The peer node routing functionality described herein may take the form of a library to be linked with one or more applications that use it. A given application can interact with library in two main ways. First, the library may provides a lookup(key) function that yields the IP address of the peer node responsible for the key. Second, the library on each peer node notifies the application of changes in the set of keys that the node is responsible for. This allows the application software to, for example, move corresponding key-object pairs to their new peer nodes when a new peer node joins.

Peer nodes that fail or otherwise leave the peer-to-peer network may cause the remaining peer nodes to temporarily have incorrect successor pointers, or keys may not yet have migrated to newly joined nodes, causing a lookup to fail. Higher-layer application modules, using the peer-to-peer service, may notice that the desired data was not found, and has the option of retrying the lookup after a pause. Alternatively, the higher layer application modules may try a back up peer node. The successor list mechanism also helps higher-layer software replicate data. A typical application using the functionality described herein might store replicas of the data associated with a key at the X nodes whose identifiers succeed the key. The fact that a peer node keeps track of its successors means that it can inform higher layer modules or functionality when successor nodes come and go, and thus when the modules should propagate data to new replicas.

To generate and maintain the p2p routing table, each peer node 24 maintains a connection to its adjacent router 29 that implements a service availability protocol or framework. As discussed above, routers 29 can implement functionality that allows for distribution of service information over routing protocols, such as EIGRP. According to one embodiment, each peer node 24 executes a service client process that interacts with a service forwarder process hosted, for example, by a router 29. A service client may advertise a service, such as a "p2p" node, and may request services or subscribe to service notifications offered by other nodes. Service forwarder processes hosted by routers 29 forwards advertisements of new and updated services automatically to each other service forwarder and to service clients that have subscribed to a given service. The service forwarders can rely on routing protocols to efficiently distribute the service messages across the network and to avoid sending updates in loops.

In a particular implementation, a peer node 24 connects to its adjacent router 29 over an access protocol, and publishes its services as objects. The peer node 24 can also subscribe for services by service ID. Routing protocols are used to distribute the information to all other nodes in order to fulfill subscriptions elsewhere in the network. Each peer node 24, as discussed below, generates its own node identifier and advertises it in the "p2p" service. In a particular implementation, the advertised node information includes a node identifier and the IP address (and, optionally, one or more ports) of the peer node 24. Each peer node 24 also subscribes for "p2p" services to learn the routing and node identifier information of other peer nodes on the peer-to-peer network 30. Each peer node 24 also maintains the connection to its adjacent router 29 using a rapid keep-alive or heartbeat. When a peer node 24 fails, the adjacent router 29 notices the cessation of heartbeat messages and withdrawing that peer node's service advertisement from the network, which allows other peer nodes to learn of the failure and reconfigure the distributed hash table. For example, when a failure occurs, the other peer nodes 24 remove the failed nodes routing information from their respective p2p routing tables. Furthermore, the node which was previously the backup for the failed node sends its copy of that portion of the hash table to the node which is now the new backup, ensuring data integrity.

Figure 3:
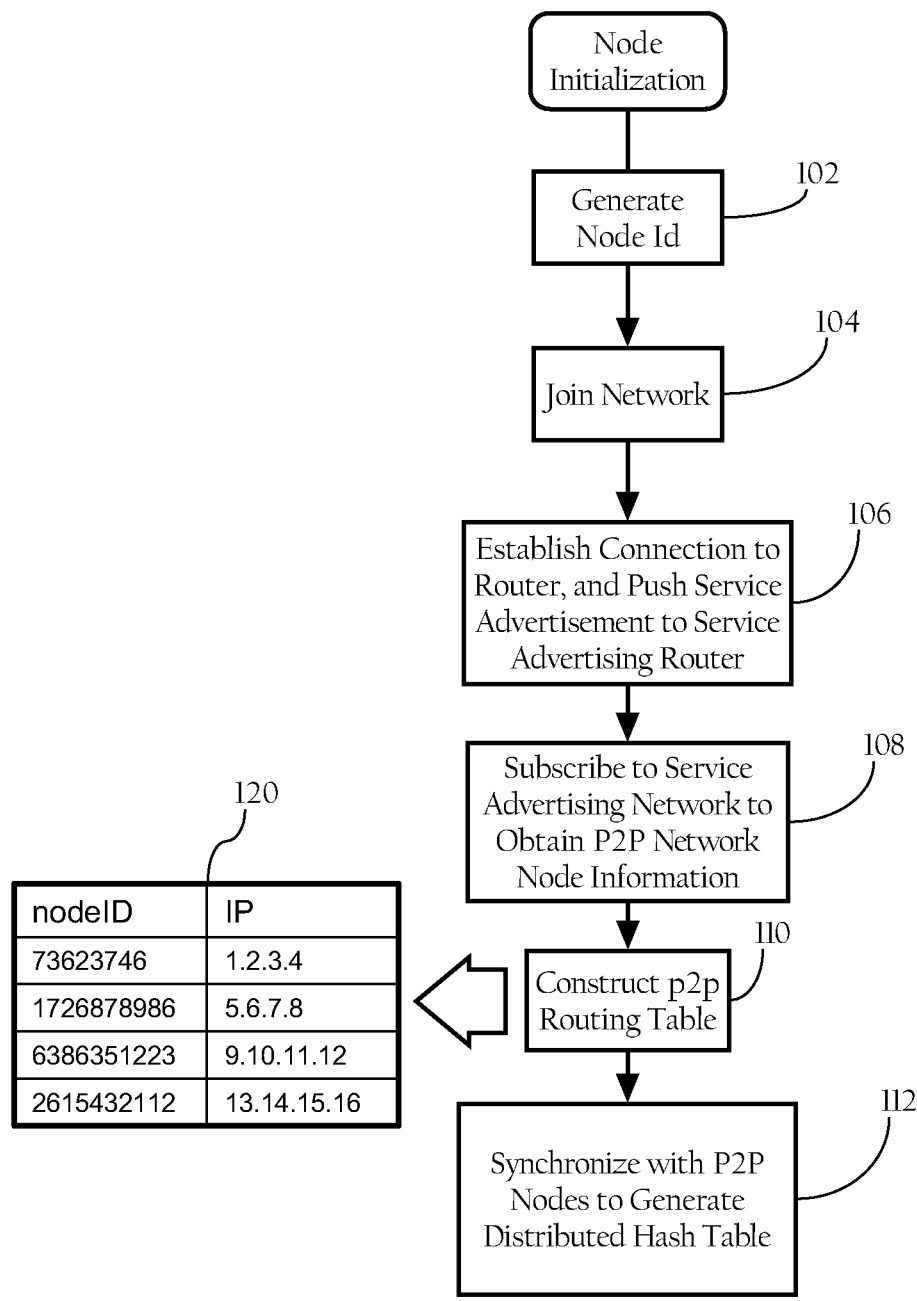
FIG. 3 is a flow diagram illustrating an example process for initializing a peer node in a peer-to-peer network.

FIG. 3 illustrates an example process flow directed to initializing a peer node 24. For example, at start-up or reboot of a peer node 24, an initialization process executed by the peer node generates a node identifier (102) and initiates discovery and other protocols to join the IP network 104 (such as receiving an IP address from a DHCP server, discovering its adjacent router 29 and the like). The peer node 24 establishes a connection to router 29, and also pushes an advertisement onto the service advertising framework supported by the network by transmitting the advertisement to its adjacent router 29 (106). This advertisement includes the node identifier for node 24 and its IP address and port. The peer node 24 also subscribes to "p2p" service on the service advertising network to obtain peer-to-peer network information, such as the service advertisements of other peer nodes (108). This provides the node with the node IDs of the other nodes, and for each, their IP addresses and ports. The peer node 24 then constructs a p2p routing table 120 (110) by placing each node ID learned in step 106 into the routing table, along with its corresponding IP address and port. The peer node 24 then interacts with other p2p nodes to obtain its section of the distributed hash table for which it has primary responsibility, and possibly other sections for which it has a back-up responsibility (112). For example, the peer node 24 may identify its successor node (relative to the m-bit hash number space) to obtain the section of the hash table up to and including its node identifier.

FIG. 4 illustrates how queries or other operations, such as reads and writes can be handled in the peer-to-peer network 30. As FIG. 4 illustrates, when a peer node 24 receives a query or operation command (such as read(key), or write(key, object)) (140), it looks up routing information in the p2p routing table 120 to identify the successor peer node based on the key (142). Using the IP address of the identified peer node, it then accesses the successor peer node to perform the query (144). As one skilled in the art will recognize, using routing protocols to maintain peer availability and reachability information, allows for queries to be handled in a single hop to a peer. This represents an order of magnitude improvement to existing peer-to-peer networks which may require up to logN or more hops in the peer-to-peer network to perform a query.

The peer-to-peer functionality described herein can be used in a variety of different contexts. For example, the peer nodes may be VoIP gateways that use the functionality to maintain VoIP call routing information in a distributed hash table, where a phone number or other identifier may be keys, and data objects may be call routing information such as an IP address of a VoIP gateway corresponding to the phone number. The peer-to-peer functionality described herein can also be used to establish a distributed network file storage system. In another implementation, the peer-to-peer network can be configured to offer distributed hash table functionality as a network service. For example, the IP network itself can provide a 'resilient DHT' as a network service. An application programmer can use the IP network to store and retrieve data with high availability. Any place in an application where a stored hash table is required, the IP network can replace it. This basic construct—a hash table that needs to be accessed by many nodes—is used in almost all distributed systems. There are many other applications of flat namespace routing. In unified communications, users are identified by phone numbers and by user@domain identifiers. When one user calls another using one of these identifiers, the call agent serving that called identifier must be found. For phone numbers that are typically assigned to users in blocks, the routing tables are relatively small and easily configured or pushed to all nodes. For user@domain identifiers, there is no structure. Typically, networks have used a large centralized database to perform this mapping. Using the functionality described herein, the call agents can form a p2p network using service advertising network infrastructure, and then store this mapping table equally amongst all peers. This eliminates the need for a centralized data store, and scales to arbitrary numbers of call agents.

"Logic" may refer to hardware, software, other logic, or any suitable combination of the preceding that may be used to provide information or instructions. Certain logic may manage the operation of a device, and may comprise, for example, a processor. "Processor" may refer to any suitable logic operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

The present invention has been explained with reference to specific embodiments. For example, while embodiments of the present invention have been described as operating in connection with peer-to-peer networks and PSTN networks, the present invention may be used in connection with any suitable network environment. Other embodiments will be evident to those of ordinary skill in the art. It is therefore not intended that the present invention be limited, except as indicated by the appended claims.

What is claimed is:

1. A method comprising:
transmitting, by a service client executing at a local peer node, a subscription request to a router implementing a service availability advertising framework in connection with one or more additional routers executing a network routing protocol, wherein the subscription request is operable to register the local peer node with the router as a subscriber to the service availability advertising framework to receive advertised information for one or more peer nodes of a peer-to-peer network;
transmitting, by the service client executing at the local peer node, one or more advertisements using the service availability advertising framework to disseminate local peer node information to the peer-to-peer network, wherein the local peer node information includes a node identifier and network reachability information;
storing, at the local peer node, a section of a distributed hash table collectively maintained by peer nodes of the peer-to-peer network, wherein the section of the distributed hash table comprises one or more hash table entries, each comprising a key and a data object;
maintaining, based on the peer node information obtained from utilizing the service availability advertising framework, a peer-to-peer routing table comprising a peer node entry for each peer node that maintains a section of the distributed hash table, each peer node entry comprising a node identifier and network reachability information;
receiving, at the local peer node, an operation request identifying a first key corresponding to a first data object; and
identifying a peer node contained in the peer-to-peer routing table corresponding to the first key, such that the operation request can be executed in a single hop to the peer node.

2. The method of claim 1, further comprising accessing the identified peer node to execute the operation request.

3. The method of claim 1 further comprising maintaining, at the local peer node, a connection to a router of the one or more routers supporting the service availability advertising framework and running the network routing protocol.

4. The method of claim 3 wherein the connection to the router includes transmission of keep-alive messages allowing the router to determine a current operational state of the local peer node.

5. The method of claim 4, wherein the current operational state of the local peer node is used to determine whether to advertise or withdraw reachability to the local peer node using the service availability advertising framework.

6. The method of claim 1 wherein network reachability information comprises a network address of a peer node.

7. The method of claim 1 wherein the operation request is a read request to obtain the first data object corresponding to the first key.

8. The method of claim 1 wherein the operation request is a write operation to write the first data object to the distributed hash table.

9. The method of claim 1 wherein the service availability advertising framework and the network routing protocol is operative to provide peer node withdrawal notifications, and wherein the method further comprises interacting, responsive to a peer node withdrawal notification for an identified peer node, with one or more other peer nodes to redistribute storage of one or more portions of the distributed hash table corresponding to the identified peer node.

10. The method of claim 1 wherein peer node entries of the peer-to-peer routing table are ordered based on respective node identifiers of peer nodes identified in the peer node information received from the service availability advertising framework.

11. The method of claim 1 further comprising generating the node identifier based on one or more attributes of the local peer node.

12. The method of claim 1 wherein the section of the distributed hash table stored at the local peer node is based on key values relative to the node identifier of the local peer node and a directly adjacent node identifier of a remote peer node.

13. An apparatus, comprising
one or more network interfaces;
a memory;
one or more processors; and
a peer-to-peer module physically stored in the memory comprising computer-readable instructions operative to cause the one or more processors to:
transmit a subscription request to a router implementing a service availability advertising framework in connection with one or more additional routers executing a network routing protocol, wherein the subscription request is operable to register the apparatus with the router as a subscriber to the service availability advertising framework and to receive advertised information for one or more peer nodes of a peer-to-peer network;

transmit one or more advertisements using the service availability advertising framework to disseminate local peer node information to the peer-to-peer network, wherein the local peer node information includes a node identifier and network reachability information;

store a section of a distributed hash table collectively maintained by peer nodes of the peer-to-peer network, wherein the section of the distributed hash table comprises one or more hash table entries, each comprising a key and a data object;

maintain, based on the peer node information obtained from utilizing the service availability advertising framework, a peer-to-peer routing table comprising a peer node entry for each peer node that maintains a section of the distributed hash table, each peer node entry comprising a node identifier and network reachability information;

receive an operation request identifying a first key corresponding to a first data object; and identify a peer node contained in the peer-to-peer routing table corresponding to the first key, such that the operation request can be executed in a single hop to the peer node.

14. The apparatus of claim 13 wherein the peer-to-peer module further includes instructions operative to cause the one or more processors to access the identified peer node to execute the operation request.

15. The apparatus of claim 13 wherein the peer-to-peer module further comprises instructions operative to cause the one or more processors to: maintain, at the local peer node, a connection to a router of the one or more routers supporting the service availability advertising framework and running the network routing protocol.

16. The apparatus of claim 13 wherein network reachability information comprises a network address of a peer node.

17. The apparatus of claim 13 wherein the operation request is a read request to obtain the first data object corresponding to the first key.

18. The apparatus of claim 13 wherein the operation request is a write operation to write the first data object to the distributed hash table.

19. The apparatus of claim 13 wherein the service availability advertising framework and the network routing protocol is operative to provide peer node withdrawal notifications, and wherein the peer-to-peer module further comprises instructions operative to cause the one or more processors to: interact, responsive to a peer node withdrawal notification for an identified peer node, with one or more other peer nodes to redistribute storage of one or more portions of the distributed hash table corresponding to the identified peer node.

20. The apparatus of claim 13 wherein peer node entries of the peer-to-peer routing table are ordered based on respective node identifiers of peer nodes identified in the peer node information received from the service availability advertising framework.

21. The apparatus of claim 13 wherein the peer-to-peer module further comprises instructions operative to cause the one or more processors to: generate the node identifier based on one or more attributes of the local peer node.

22. The apparatus of claim 13 wherein the section of the distributed hash table stored at the local peer node is based on key values relative to the node identifier of the local peer node and a directly adjacent node identifier of a remote peer node.

23. A non-transitory computer readable media comprising instructions for execution by a processor and when executed operable to cause the processor to:

transmit, by a service client executing at a local peer node, a subscription request to a router implementing a service availability advertising framework in connection with one or more additional routers executing a network routing protocol, wherein the subscription request is operable to register the local peer node with the router as a subscriber to the service availability advertising framework and to receive advertised information for one or more peer nodes of a peer-to-peer network;

transmit, by the service client executing at the local peer node, one or more advertisements using the service availability advertising framework to disseminate local peer node information to the peer-to-peer network, wherein the local peer node information includes a node identifier and network reachability information;

store, at the local peer node, a section of a distributed hash table collectively maintained by peer nodes of the peer-to-peer network, wherein the section of the distributed hash table comprises one or more hash table entries, each comprising a key and a data object;

maintain, based on the peer node information obtained from utilizing the service availability advertising framework, a peer-to-peer routing table comprising a peer node entry for each peer node that maintains a section of the distributed hash table, each peer node entry comprising a node identifier and network reachability information;

receive, at the local peer node, an operation request identifying a first key corresponding to a first data object; and identify a peer node contained in the peer-to-peer routing table corresponding to the first key, such that the operation request can be executed in a single hop to the peer node.

24. The non-transitory computer-readable media of claim 23 wherein the logic is further operable to access the identified peer node to execute the operation request.

25. The non-transitory computer-readable media of claim 23 wherein the logic is further operable to: maintain, at the local peer node, a connection to a router of the one or more routers supporting the service availability advertising framework and running the network routing protocol.

* * * * *